(12) United States Patent
Van De Sluis et al.

(10) Patent No.: US 9,686,843 B2
(45) Date of Patent: Jun. 20, 2017

(54) LIGHTING DEVICE

(71) Applicant: PHILIPS LIGHTING HOLDING B.V., Eindhoven (NL)

(72) Inventors: Bartel Marinus Van De Sluis, Eindhoven (NL); Marius Leendert Trouwborst, Den Bosch (NL); Jacobus Petrus Johannes Van Os, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/872,216

(22) Filed: Oct. 1, 2015

(65) Prior Publication Data

US 2016/0100471 A1    Apr. 7, 2016

(30) Foreign Application Priority Data

Oct. 1, 2014    (EP) .................................... 14187258

(51) Int. Cl.
H05B 37/02    (2006.01)

(52) U.S. Cl.
CPC ....... H05B 37/029 (2013.01); H05B 37/0227 (2013.01); H05B 37/0272 (2013.01)

(58) Field of Classification Search
None
See application file for complete search history.

(56) References Cited

U.S. PATENT DOCUMENTS 4,388,567 A * 6/1983 Yamazaki ............ H05B 37/029
307/40
4,980,807 A * 12/1990 Von Kohorn ............ A01G 9/02
362/122

(Continued)

FOREIGN PATENT DOCUMENTS

EP    1870802 A1    12/2007
GB    2440784 A    2/2008

(Continued)

OTHER PUBLICATIONS

"A Participative Light and Sound Show Using Mobile Phones in Crowds", https://ww.sics.se/projects/opphos.

(Continued)

*Primary Examiner* — Crystal L Hammond
(74) *Attorney, Agent, or Firm* — Meenakshy Chakravorty (57) ABSTRACT

There is provided a wearable or portable lighting device for playing out, together with a plurality of other wearable or portable lighting devices, a predetermined time-varying lighting pattern over a space occupied by said device and the other devices; said device comprising: at least one light source; memory for storing a representation of the time-varying lighting pattern; and at least one controller configured to determine a current location of said device, to receive a timing signal for determining a current stage of the time-varying lighting pattern in synchronization with the other devices, and based on said determination and said timing signal, with reference to the representation in memory, to select a portion of the time-varying lighting pattern corresponding to the current location and stage and to cause the at least one light source to play-out said portion.

15 Claims, 3 Drawing Sheets

(56) References Cited

U.S. PATENT DOCUMENTS

| | | | | |
|---|---|---|---|---|
| 5,936,362 A * | 8/1999 | Alt | | H05B 37/0281 |
| | | | | 239/70 |
| 6,031,343 A * | 2/2000 | Recknagel | | A63D 1/08 |
| | | | | 315/292 |
| 7,697,925 B1 * | 4/2010 | Wilson | | H04M 1/22 |
| | | | | 455/418 |
| 7,864,043 B2 * | 1/2011 | Camp, Jr. | | G01S 5/0252 |
| | | | | 340/539.13 |
| 8,400,399 B2 * | 3/2013 | Geurts | | A63F 13/02 |
| | | | | 340/323 R |
| 9,045,185 B2 * | 6/2015 | Chen | | B62J 6/00 |
| 9,142,242 B1 * | 9/2015 | Peters | | G11B 7/00 |
| 9,205,277 B2 * | 12/2015 | Feng | | A61N 5/0618 |
| 9,245,307 B2 * | 1/2016 | Margalit | | G06T 1/0007 |
| 9,488,471 B2 * | 11/2016 | Shulman | | G01B 11/2513 |
| 2002/0140379 A1 * | 10/2002 | Chevalier | | H05B 33/0803 |
| | | | | 315/291 |
| 2003/0137258 A1 * | 7/2003 | Piepgras | | H05B 33/0857 |
| | | | | 315/291 |
| 2006/0007669 A1 * | 1/2006 | Blackburn | | A41D 19/0157 |
| | | | | 362/103 |
| 2006/0038498 A1 * | 2/2006 | Maurer | | H04M 1/22 |
| | | | | 315/123 |
| 2006/0097660 A1 * | 5/2006 | Scott | | H05B 37/0272 |
| | | | | 315/291 |
| 2009/0184837 A1 * | 7/2009 | De Prycker | | G06F 3/1446 |
| | | | | 340/686.1 |
| 2010/0176750 A1 | 7/2010 | West | | |
| 2012/0078393 A1 * | 3/2012 | Kotb | | H05B 37/0272 |
| | | | | 700/90 |
| 2012/0139425 A1 * | 6/2012 | Kim | | F21S 2/005 |
| | | | | 315/152 |
| 2012/0146552 A1 | 6/2012 | West | | |
| 2012/0299510 A1 * | 11/2012 | Schenk | | H05B 37/029 |
| | | | | 315/294 |
| 2013/0028475 A1 * | 1/2013 | Ganick | | G01C 21/206 |
| | | | | 382/103 |
| 2014/0132154 A1 * | 5/2014 | Fried | | H05B 37/0254 |
| | | | | 315/76 |
| 2014/0354160 A1 * | 12/2014 | Aggarwal | | H05B 37/0227 |
| | | | | 315/152 |
| 2015/0084515 A1 * | 3/2015 | Altamura | | H05B 37/0245 |
| | | | | 315/131 |
| 2015/0129745 A1 * | 5/2015 | Smith | | G01S 17/89 |
| | | | | 250/206 |
| 2015/0181678 A1 * | 6/2015 | Sachs | | H05B 37/0218 |
| | | | | 315/152 |
| 2015/0351204 A1 * | 12/2015 | Hershberg | | G08C 23/02 |
| | | | | 315/153 |
| 2016/0044766 A1 * | 2/2016 | Alexander | | H05B 37/0227 |
| | | | | 315/291 |

FOREIGN PATENT DOCUMENTS

| | | |
|---|---|---|
| WO | 2006126122 A2 | 11/2006 |
| WO | 2013021209 A1 | 2/2013 |
| WO | 2013128353 A2 | 9/2013 |

OTHER PUBLICATIONS

LED Lighting technology, Lighting effects on crowd, http://pixmob.com/technology.

* cited by examiner

LIGHTING DEVICE

CROSS-REFERENCES TO RELATED APPLICATIONS

This patent application claims priority from European patent application 14187258.0 filed on Oct. 1, 2014, the entirety of which application is hereby incorporated by reference as if fully set forth herein.

FIELD OF THE INVENTION

The present invention generally relates to a lighting device, a centralized control unit and a lighting system comprising the same.

BACKGROUND OF THE INVENTION

A plurality of wearable and/or handheld lighting devices located within a space can each be controlled to collectively render a synchronized lighting effect that creates an immersive light experience as part of concerts and other events with large crowds. In one example involving a concert, a plurality of user-held lighting devices within an arena are each configured to emit a light corresponding to a respective part of a preconfigured light show. The light emitted by each of the plurality of devices is configured such that, at a distance from the user-held devices, an overall image/lighting effect is formed. This is shown in FIG. 1.

Figure 1:
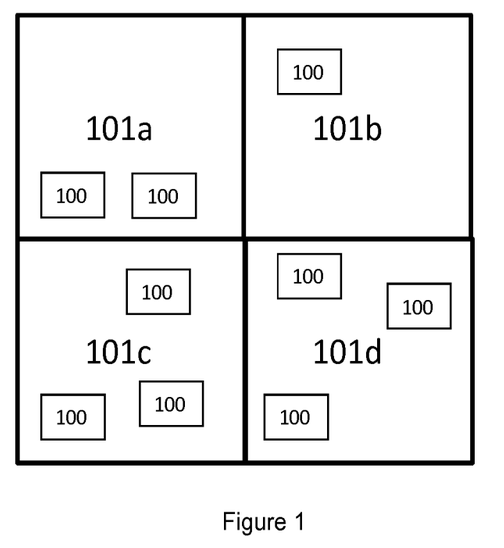
FIG. 1 illustrates an example lighting system.

FIG. 1 shows an arena comprising a plurality of lighting devices 100 in the form of handheld user lighting devices. The arena is divided into a plurality of light regions 101a-101d, with one or more of the lighting devices 100 falling within each of the regions. In other words, each region comprises at least one lighting device 100. The lighting devices 100 may be arranged to output a particular sequence of colored light in dependence on which region they are located in. For example, assume that the arena is divided into quadrants. The handheld lighting devices in the upper left quadrant 101a are initially configured to emit a blue light, before cycling through red, green and yellow lights. The handheld lighting devices in the upper right quadrant 101b are initially configured to emit a red light before cycling through green, yellow and blue lights. The handheld lighting devices in the lower left quadrant 101c are initially configured to emit a green light before cycling through yellow, blue and red lights. Finally, the handheld lighting devices in the lower right quadrant are initially configured to emit a yellow light before cycling through blue, red and green lights. In this manner, a particular large-scale lighting effect can be achieved. A camera directed towards these handheld lighting devices may then record the lighting effect before outputting the recorded lighting effect to a display that the users of the handheld lighting devices can view in real-time. The lighting effect may be synchronized to an audio track being played at the concert.

There are numerous ways of coordinating the lighting show provided by the handheld lighting devices. One way of doing this is for a centralized control unit to periodically send respective lighting control information for a particular time period to each of the plurality of lighting devices based on a determined location of the lighting devices.

SUMMARY OF THE INVENTION

When such lighting effects are based on time-varying pattern, such as a video file, a robust and reliable way to control thousands of such lighting devices is required. Streaming the data to every wearable or portable lighting device in real time is technologically challenging, expensive and reduces the battery time of the wearable or portable lighting devices.

To address this, the present application proposes a system for controlling multiple wearable or portable lighting devices.

According to one aspect, there is provided a wearable or portable lighting device for playing out, together with a plurality of other wearable or portable lighting devices, a predetermined time-varying lighting pattern over a space occupied by said device and the other devices; said device comprising: at least one light source; memory for storing a representation of the time-varying lighting pattern; and at least one controller configured to determine a current location of said device, to receive a timing signal for determining a current stage of the time-varying lighting pattern in synchronization with the other devices, and based on said determination and said timing signal, with reference to the representation in memory, to select a portion of the time-varying lighting pattern corresponding to the current location and stage and to cause the at least one light source to play-out said portion.

Advantageously, the predetermined time-varying lighting pattern has elements (or portions) that are accessed via both a current location of the lighting device and a current time. Thus, as either of these quantities change, the portion of the predetermined time-varying lighting pattern currently being played-out by the lighting device also changes. This allows for multiple lighting devices to be synchronized so as to, together, play out a predetermined time-varying pattern over a space without the need for users to stay in a predetermined location (e.g. their seats). To avoid sending substantial amounts of data during an event, the predetermined time-varying lighting pattern mentioned above can comprise the entire time-varying lighting pattern to be played out during that event. It is thus understood that a lighting device only plays out a portion of the stored predetermined time-varying lighting pattern during a single event.

In another embodiment, there is provided a centralized control unit comprising a controller configured to: send a predetermined time-varying lighting pattern for forming a lighting pattern over a space to a plurality of lighting devices; and send to each of the lighting devices a timing signal, wherein for each lighting device the timing signal can be used in combination with a current location of said device to identify a portion of the predetermined time-varying lighting pattern for playing-out said portion.

BRIEF DESCRIPTION OF THE DRAWINGS

These and other aspects will now be described in more detail, with reference to the appended figures showing embodiments.

All the figures are schematic, not necessarily to scale, and generally only show parts for elucidating various embodiments or aspects of the invention, wherein other parts may be omitted or merely suggested.

DETAILED DESCRIPTION

Figure 2:
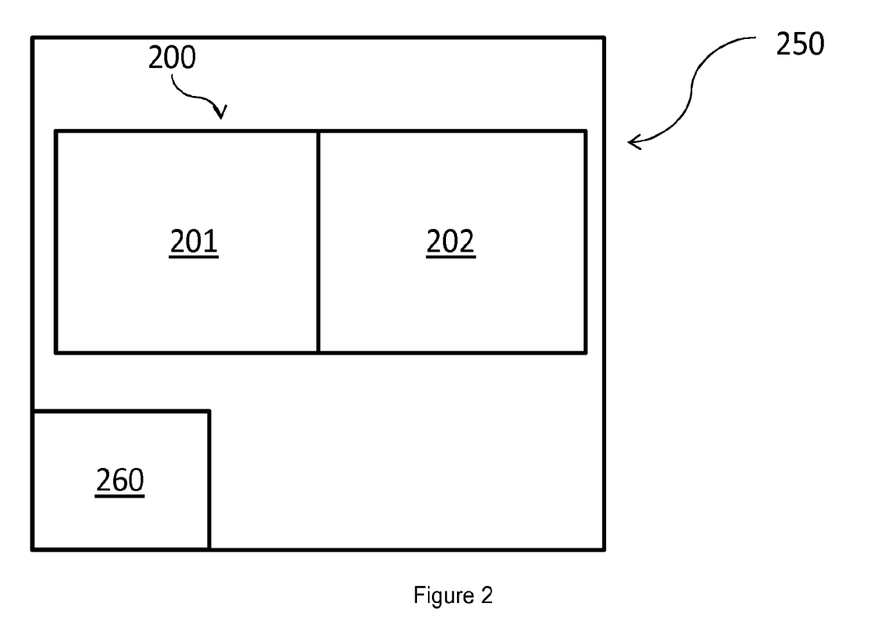
FIG. 2 illustrates an example lighting system.

FIG. 2 shows a lighting system 200 comprising a plurality of light regions 201, 202. Although only two regions are shown (and described below) for the sake of illustration, it will be understood that more than two of such regions may be comprised within the lighting system 200. The lighting system 200 may be dedicated to provide illumination for a specific space comprising the plurality of light regions 201, 202, such as (in the present example) an arena of a concert hall 250 during a concert. One light region 201 may be constituted by one or a group of lighting devices (such as is described below) for illuminating a specific region of the concert hall 250. The other light region 202 may be constituted by one or a group of lighting devices (such as is described below) for illuminating a different specific region of the concert hall 250. The light regions 201, 202 do not necessarily have to be immediately adjacent to each other, though that is one possibility.

The lighting system 100 may further comprise a centralized control unit 260 for controlling the light regions 201, 202, although this not essential to some embodiments described herein. The centralized control unit 260 may receive instructions for controlling the light regions 201, 202 either from a remote source or a local source. As an example of a remote source, the centralized control unit 260 may receive an instruction regarding how the arena should be lit during a subsequent time period from a control unit located outside of the arena (e.g. from a remote computer terminal or server). In this case, the centralized control unit 260 would comprise an interface suitable for receiving communications according to at least one communication protocol. Therefore, the centralized control unit 260 would comprise an interface allowing external control of the lighting system 200, such as an API (application programming interface). For example, the lighting system 200 may be externally controlled according to an IP (internet protocol) based standardized lighting control and management protocol and/or a Web Service based lighting control and management protocol, which may be defined on top of a CoAP (constrained application protocol) or a HTTP (hypertext transfer protocol) application protocol. As an example of a local source, the centralized control unit 260 may receive an instruction regarding how the arena should be lit during a subsequent time period from an input provided by a local operator. In this latter case, the centralized control unit 260 would comprise a user interface for receiving the input from the local operator e.g. the centralized control unit 260 may take the form of a computer terminal or lighting desk. In both of these cases, the instruction may indicate a particular predetermined time-varying lighting pattern to be played out, and/or timings associated with that predetermined time-varying lighting pattern.

As mentioned above, the lighting system is configured to provide an immersive lighting experience to users located within the specific space. To do this, there is provided a plurality of wearable or portable lighting devices suitable for playing out a predetermined time-varying lighting pattern over a space occupied by the plurality of the lighting devices. Embodiments of such lighting devices are now described.

Each of the lighting devices comprises: at least one light source; memory for storing a representation of the time-varying lighting pattern; and at least one controller configured to determine a first current location of that lighting device, to receive a timing signal for determining a current stage of the time-varying lighting pattern in synchronization with the other lighting devices, and based on said determination and said timing signal, with reference to the representation in memory, to select a portion of the time-varying lighting pattern corresponding to the current location and stage and to cause the at least one light source to play-out said portion.

Thus, assuming that the predetermined time-varying lighting pattern is stored in memory as a video, each lighting device receives an input on its location and a play-out time and determines a pixel in the video file based on both this location information and play-out time. This pixel represents the lighting to be emitted by that lighting device at that time at the location of the lighting device and so the lighting device controls its light output at that time so as to be representative of this pixel.

Figure 3:
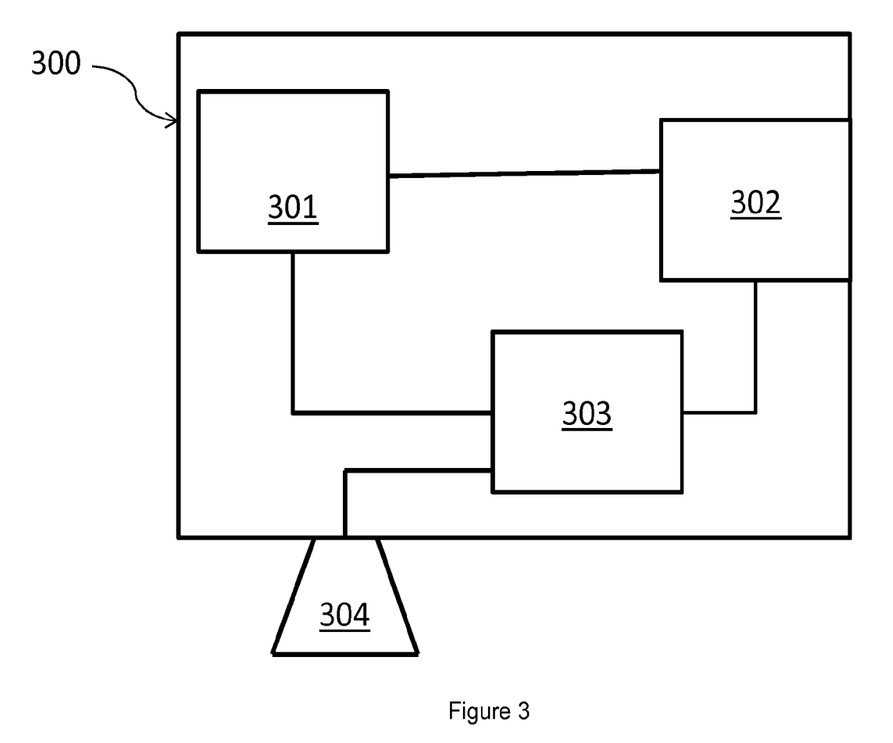
FIG. 3 illustrates a schematic of an example lighting device.

A schematic of such a lighting device 300 is shown in FIG. 3. The lighting device 300 of FIG. 3 comprises data storage 301, a receiver 302 for (in suitable embodiments) receiving a location input, a processor 303 and at least one light source 304. In this instance, the processor 303 implements the functionality of the above (and below) described controller. The data storage is configured to store the entire video content of the predetermined time-varying lighting pattern to be played over the course of an event (although it is understood that a lighting device will not play out the entire light show stored in the memory). The processor 303 is configured to derive partial content (such as a pixel/segment of a light show) from the entire stored predetermined time-varying light sequence based on a determination of a current location and on a timing signal received by the controller suitable for determining a current stage of the time-varying lighting pattern. The processor 303 is further configured to cause a lighting control signal to be passed to the at least one light source 304 based on this partial content. The lighting control signal controls the light emitted by the at least one light source 304.

The at least one light source may be a single light source in isolation, such as a light emitting diode. The at least one light source of the lighting device may be a pixel of a display, such as a liquid crystal (LCD) display, comprising multiple pixels. The at least one light source of the lighting device may be a set number of pixels of a display of the lighting device. The set number may be equal to or less than the total number of pixels on the display. This is useful where the display of the lighting device is to be configured to function as either one or multiple pixels in an overall image to be formed by a collection of similarly configured lighting devices. Thus, when the display of the lighting device is configured to act as two pixels in the overall image, half of the pixels of the display may form one of the overall-image pixels whilst the other half of the pixels of the display may form the other overall-image pixel. It is understood that there does not have to be an equal number of pixels of the display for both of the overall-image pixel. The overall-image produced by the similarly configured lighting devices is discernible from a distance at which the light emitted from all of the similarly configured lighting devices can be viewed. It is understood that the term "image" is merely illustrative and intended to convey a predetermined configuration of lighting elements across the specific space.

The lighting device 300 may comprise multiple types of memory. For example, there may be a read-only portion and a flash portion. The memory may be embedded in the lighting device and/or may reside on a removable drive. By "removable", it is meant that the drive is configured for repeated easy insertion and removal from the lighting device.

The controller may be a processor, or a bank of processors, configured to execute instructions loaded into the temporary memory (such as random-access memory).

Now, various features and/or embodiments associated with the lighting device and the functionality executed thereby is described.

The lighting device 300 is preferably a lighting device 300 that is wearable by a user in the space or may otherwise be held by or attached to a user in the space. For example, the lighting device 300 may be any of: a mobile phone of the user, a wristband, a t-shirt and/or a wand.

The controller of the lighting device 300 is configured to select a first portion of the predetermined time-varying lighting pattern in dependence on both the first current location and the timing signal. Thus the ways in which a current location can be determined will be explored first, before looking at different timing signals.

The controller of the lighting device 300 is configured to determine a current location of the lighting device 300. This may be determined in any of a variety of ways.

For example, the controller may determine the location following receipt at the lighting device 300 of a location indication from a centralized control unit 260 (as described above and/or below). In other words, the centralized control unit 260 is able to determine the location of the lighting device 300 and to inform the controller of the lighting device 300 of its locality via a suitable wireless channel. The camera and/or the projector embodiments described below may be used by the centralized control unit 260 to determine the location of the lighting device 300. The centralized control unit 260 may be local. By local, it is meant within the vicinity of the lighting device 300. For example, a controller in the vicinity of the concert hall. The local centralized control unit may have previously provided the video data to the lighting device 300.

Described below are some of the examples of how the centralized control unit 260 and/or the controller of the lighting device 300 may obtain location information (although the following is described in terms of the controller of the lighting device 300 determining the location, the centralized control unit 260 may receive this information instead and forward it on to the controller of the lighting device 300).

The controller of a lighting device 300 may determine the location of its lighting device 300 based on the receipt of location information from a location services provider, such as from a global positioning system and/or via a cellular services provider.

The controller may determine the location following receipt at the lighting device 300 of location information from similar adjacent lighting devices 300.

The lighting device 300 may determine its location using location information received via receiver 302 from a camera directed towards the lighting device 300. In this case, the camera is orientated such that the lighting device 300 is viewable within the lens-view of the camera. The information received from the camera may be used to determine the location of the lighting device 300. For example, the camera may observe a lighting device 300 cycling through a particular light sequence and that information may be used to locate the lighting device 300 in the view of the camera. The camera information may be relayed via another lighting device 300 in the vicinity. In an example, the lighting devices may be turned on one-by-one and/or lighting devices in different segments of the crowds may be turned on simultaneously. The corresponding view captured by the camera may be used to determine the location of at least one of the active lighting devices.

Alternatively or additionally, the lighting device 300 may determine its location using location information received via receiver 302 from a projector directed towards the lighting device 300. The projector (such as an infra-red projector), may be configured to project lighting coordinates to individual lighting devices. The projector may project a first light signal or flash to facilitate localization. This first light signal or flash may also be used as the above-mentioned timing signal (e.g. as a trigger and/or an indication of the time at which the selected portion of the time-varying pattern should be played out). However, it is understood that a second light signal or flash may be used as the above-mentioned timing signal. This latter system has an advantage of allowing the lighting device more time to select the portion for play-out whereas the other system has an advantage of minimizing the number of transmissions to be made. The projector may convey such information as is mentioned above using coded, modulated light. Another manner of determining the location of a lighting device is to using an electrical signal (such as a radio frequency signal) comprising the absolute or relative location of the lighting device. A relative or absolute location measurement may also be made by the lighting device itself.

Alternatively or additionally, the lighting device 300 may determine its location using location information received from at least one of a variety of location service providers. For example, from satellite based GPS-like system. The lighting device 300 may also obtain location information from neighboring lighting devices 300. This includes both relative and absolute location information.

Now the role of, and different types of timing signal are discussed.

The timing signal is received by the controller of the lighting device 300 and used by that controller to determine a time at which the first portion should be played out.

The timing signal may be a trigger signal received from the centralized control unit.

Alternatively or in addition, the timing signal may be received in advance from an external source (such as the above-mentioned centralized control unit 260). In this case, the controller on the lighting device 300 assesses the timing signal relative to an internal determination of an absolute or relative time made by the lighting device 300 itself i.e. each lighting device 300 may comprise a respective local clock operable to keep time in synchronization with the other lighting devices 300, wherein the timing signal specifies a timing of the time-varying pattern in advance. For example, the timing signal may comprise an advance schedule for the lighting pattern, or the timing inherent in the video. Said selection by a particular lighting device 300 may then be performed by reference to its local clock.

Now, the predetermined time-varying lighting pattern is discussed.

The predetermined time-varying lighting pattern is preferably the lighting pattern to be played out during an entire show e.g. a concert. In other words, the predetermined time-varying lighting pattern comprises lighting information for the entire specific space for the duration of the event. This means that each lighting device 300 does not have to receive multiple data updates throughout the event/show that comprise video and/or image data. Thus this system can reduce the transmission overhead that takes place during the show.

The time-varying lighting pattern is preferably entirely stored in the read only memory in the lighting device 300. During execution, the portion of the time-varying lighting pattern is loaded into temporary memory (such as RAM) for execution by the controller.

The predetermined time-varying lighting pattern may be stored as video data. In this case, the timing signal could help determine a frame synchronization with the video. Further, the first current location may be used to locate an area in the determined frame e.g. a pixel, as described above. The predetermined time-varying pattern and/or the mapping between time, location and video pixels may be stored such that a range of times and/or locations corresponds to the same pixel. Further, it is preferable for the spatial resolution of the video to be selected in dependence on the number of the plurality of the lighting devices to be used in the system. For example, a lower number of lighting devices may require a video having a higher spatial resolution than the spatial resolution used for a higher number of lighting devices 300. The video to be used in the system may be sent wirelessly to all lighting devices 300 before the start of the event, e.g. sent out wirelessly by the centralized control unit 260. Alternatively, the video to be used in the system may be stored on flash cards that can be inserted into respective lighting devices.

The portion of the time-varying pattern may be further selected in dependence on at least one of: the age of a user of the lighting device 300; and/or a status of the user while the portion is being played-out. For example, when near a bar at the venue, the lighting pattern emitted by the lighting device 300 may change to indicate whether the user is of or over the minimum purchase age for alcohol.

Preferably, when a change in location is detected by a device, the portion of the time-varying lighting pattern output by that lighting device 300 is updated using the same procedure. Thus the controller may be further configured to: determine a second current location of the lighting device 300 during a subsequent stage of time-varying lighting pattern and to cause the at least one light source to play-out a further portion of the time-varying potion of the time-varying lighting pattern corresponding to the second current location. In other words, the controller is configured to update the portion of video data being played out via a display if the lighting device 300 moves into a region associated with a different portion of the image mentioned above. In other words, the lighting device 300 will play out the video data associated with that different portion of the image. In this manner, even if the lighting device 300 moves around with a user, the overall-image will remain clear and unmixed. The second current location may thus be associated with a different portion of the time-varying lighting pattern than the first current location. In other words, the further portion may be different to the portion of claim 1.

Now, further operations of the controller of the lighting device 300 in embodiments are discussed.

The controller is further configured to cause the at least one light source to initiate play-out of said first portion of the predetermined time-varying lighting pattern. As described above, there are a plurality of lighting devices 300 configured to operate as described in close proximity to each other e.g. within an arena or concert hall. Together, the light emitted by each of the plurality of lighting devices 300 cooperates to form an image that is visible from a distance at which all of the plurality of lighting devices 300 can be viewed simultaneously. The portion of the predetermined time-varying lighting pattern output by the lighting 300 device corresponds to a fraction (e.g. a pixel) of this image. Thus, said play-out can be said to cause a fraction of an image to be output from the lighting device 300. It is understood that, by "image", it is merely meant a particular preconfigured orientation of lights (or a particular instant of the time-varying lighting pattern). As time and/or the location of a lighting device 300 changes, the selected frame and/or pixel of the predetermined time-varying lighting pattern being played out also changes.

The controller of the lighting device 300 may be further configured to only cause the at least one light source to play-out the further portion on condition that the second current location is different than the first current location by more than a predetermined amount. This means that the at least one light source will not needlessly oscillate between different portions where a user is close to a boundary region. Also, this process allows a lighting device 300 to not use as much battery power compared to the case where location information is always used to determine a frame/pixel synchronization, as repeated reloading different portions of the time-varying lighting pattern is avoided. The predetermined amount may be dependent on the size of the space in which the lighting devices 300 are and/or on the resolution of an image to be made by the time-varying lighting pattern at a given instant.

The controller may be configured to control a lighting parameter (e.g. the intensity, the number of pixels/the fractional number of light sources of the device to be used for playing out the selected portion, etc.) of the portion played out by the at least one light source in dependence on the number of similarly configured lighting devices 300 in the immediate locality of the lighting device 300. For example, if there are lots of similarly configured lighting devices 300 in the immediate locality of the lighting device 300, the intensity of the portion played out may be lower than in the event of there being fewer similarly configured lighting devices 300 in the immediate locality of the lighting device 300. The lighting parameter can be selected or configured so that the image mentioned above appears to be of relatively uniform intensity across the space in which the plurality of devices is located. The number of similarly configured lighting devices 300 in the immediate locality may be determined by determining the number of lighting devices 300 within a predetermined number of meters of the lighting device 300. For example, the number of lighting devices 300 within a radius of 1 m of the lighting device 300 under consideration may be determined. The lighting parameter may then be selected based on the number of similarly configured lighting devices 300 determined to be in the immediate locality and the total number of the plurality of lighting devices 300.

The lighting device 300 may be flexible and further comprise a sensor configured to determine the shape and/or orientation of the lighting device 300. The controller 303 of the lighting device 300 may be further configured to use the determined shape and/or orientation of the lighting device 300 to modify the first portion played out in order to customize the played out portion for the current shape and/or orientation of the lighting device 300. In this manner, the overall-image formed by the plurality of lighting devices 300 may have less distortion than when the configuration and/or shape of the lighting device 300 is not taken into account.

It is further understood that the lighting device 300 may receive additional signals that may be used in the selection of a portion of the time-varying lighting pattern corresponding to the first current location and stage. For example, the lighting device 300 may receive a signal to select the portion as an initial step in the process outlined above. In response to this received signal, the lighting device 300 may then determine the current location and the current stage for selecting the portion as described above. Alternatively or in addition, the lighting device 300 may receive a signal that indicates a particular time-varying lighting pattern (e.g. that indicates one video file out of multiple stored video files) stored in the memory of the lighting device 300 from which the portion is to be selected.

Some more detail is now discussed regarding the centralized control unit 260 in accordance with some embodiments of the present disclosure. The centralized control unit 260 may operate in the lighting system 200 described above. The centralized control unit 260 is configured to send the predetermined time-varying lighting pattern for forming a lighting pattern over a space to a plurality of lighting devices 300; and send to each of the lighting devices 300 the timing signal, wherein for each lighting device the timing signal can be used in combination with a current location of said lighting device to identify a portion of the predetermined time-varying lighting pattern for playing-out said portion.

This centralized control unit 260 may be used in conjunction with the above-mentioned plurality of lighting devices 300. The centralized control unit is preferably located locally to the space in which the plurality of lighting devices 300 is operating.

The centralized control unit 260 may be configured to determine a location for each of the plurality of lighting devices 300 and to send to each lighting device 300 an indication of the respective location of that lighting device 300 for any lighting device 300 whose location has changed. Preferably, to reduce the amount of overhead during a concert, the location is only transmitted if it has changed from the previous location by more than a predetermined amount.

The centralized control unit 260 may be further configured to provide at least one of the plurality of lighting devices with a timing indication for use in selecting said portion of said video data.

Note however that the centralized control unit 260 is not necessarily required in all possible embodiments. For example, the time-varying pattern may be pre-loaded onto each of the lighting devices (e.g. by means of a memory stick or even at the time of manufacture), and/or the timing signal could be shared wirelessly between the lighting devices in a distributed fashion.

A particular embodiment of a lighting system 200 is now described.

In the system, there are a plurality of such wearable/attachable lighting devices, each of which is associated with a respective user. Each wearable lighting device has an entire video stored locally (e.g. on a flash card) that is accessible to that lighting device.

During the experience, the plurality of lighting devices 300 are in the same locality as each other such that their users form a crowd. Just before the start of the experience, the lighting devices receive input on their location in the crowd from the centralized control unit. The lighting devices may also receive location information from the centralized control unit during the experience to update the location. Each wearable lighting device 300 is also configured to receive timing signals from a centralized control unit 260 during play-out of the video that corresponds to a time in the video file.

Based on the determined location, the wearable lighting device plays-out only a part of the video during the subsequent segment, for example, one or a set (not all) of spatially adjacent pixels in the video. The part of the video may comprise one or more pixels. In other, words, the output may have both a left-handed and a right-handed component that are the same or different. It may be desirable to include sensing means to determine the orientation or shape of the output of the lighting device. For example, it would be useful for the lighting device to determine the orientation of its light output relative to the lens of a camera recording the space in which the lighting device is located. Further, when the lighting device is flexible, it would be useful for both the shape and orientation of the lighting device to be determined.

A camera, such as the one mentioned above, captures the light pattern effect resulting from each lighting device playing their selected part of the video. This resulting light pattern is then displayed to the crowd via a display screen directed towards the crowd.

In addition to the location and timing information, the selection of the part of the video to be played out in a subsequent time period may be performed in dependence on the function of the lighting device. For example, the lighting device may be used to indicate a user's age (e.g. above or below 18 years old) at the bar, or a color indicative of the person's role at the event while at the reception desk.

Each of the plurality of lighting devices may determine when to start playing out the selected part of the video following the receipt of a trigger signal. Alternatively, each of the plurality of lighting devices may determine when to start playing out the selected part of the video following receipt of an absolute or relative time stamp until the start of the play-out time.

Where the centralized control unit operates in an area having a camera having a field of view that encompasses the plurality of lighting devices, the centralized control unit comprises a processor for determining location information for each of the plurality of lighting devices from information received from the camera relating to the field of view recorded by the camera.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunications systems. Any reference signs in the claims should not be construed as limiting the scope.

The invention claimed is:

1. A wearable or portable lighting device for playing out, together with a plurality of other wearable or portable lighting devices, a predetermined time-varying lighting pattern over a space occupied by said device and the other devices; said device comprising:
   at least one light source;
   memory for storing an entire representation of the time-varying lighting pattern; and
   at least one controller configured to determine a first current location of said device, to receive a timing signal for determining a current stage of the time-varying lighting pattern in synchronization with the other devices, and based on said location determination and said timing signal, with reference to the entire representation in memory, to select just a portion of the entire representation of the time-varying lighting pattern stored in memory, the portion corresponding to the first current location and stage, and to cause the at least one light source to play-out said selected portion, wherein the controller is further configured to determine, during playing out of the lighting pattern, a number of similarly configured lighting devices within a predetermined distance of the first current location, and to adjust, based on the determined number of similarly configured lighting devices, a lighting parameter of the selected portion as it is played-out, wherein the number of similarly configured lighting devices within a predetermined distance of the first current location varies during playing out of the lighting pattern.

2. A device as claimed in claim 1, wherein the timing signal is a trigger signal from a centralized control unit remote from the device.

3. A device as claimed in claim 1, further comprising a local clock operable to keep time in synchronization with the other devices, wherein the timing signal specifies a timing of the time-varying pattern in advance, and said selection is performed by reference to the local clock.

4. A device as claimed in claim 1, further comprising a receiver configured to receive information from a camera directed towards the device, wherein said information is used to determine the location of the device.

5. A device as claimed in claim 1, further comprising a receiver configured to receive information from a projector directed towards the device, wherein said information is used to determine the location of the device.

6. A device as claimed in claim 1, wherein said portion is further selected in dependence on at least one of: the age of a user of the device; and/or a status of the user while the portion is being played out.

7. A device as claimed in claim 1, wherein the controller is further configured to determine a second current location of the device at a subsequent stage of the time-varying lighting pattern, and to cause the at least one light source to play-out of a further portion of the same time-varying lighting pattern corresponding to the second current location and stage, wherein the second current location is different from the first current location.

8. A device as claimed in claim 7, wherein the controller is configured to cause the at least one light source to play-out the further portion on condition that the second current location is different than said first current location by more than a predetermined amount.

9. A device as claimed in claim 1, wherein the device comprises a sensor configured to determine the shape and/or orientation of the at least one light source in the device.

10. A lighting system comprising;
a plurality of devices as claimed in claim 1; and
a centralized control unit configured to:
send a predetermined time-varying lighting pattern for forming a time-varying lighting pattern over a space to the plurality of devices;
send to each of the devices a timing signal for determining a current stage of the time-varying lighting pattern, wherein for each device the timing signal can be used in combination with a current location of said device to identify and select a portion of the predetermined time-varying lighting pattern for playing-out; and
transmit information to each of the plurality of devices for determining the current location in each device.

11. A device as claimed in claim 1, wherein the device comprises a sensor configured to determine the shape of the at least one light source in the device.

12. A centralized control unit comprising a controller configured to:
send an entire predetermined time-varying lighting pattern for forming a time-varying lighting pattern over a space to a plurality of devices within the space;
send to each of the devices a timing signal for determining a current stage of the time-varying lighting pattern, wherein for each device the timing signal can be used in combination with a current location of said device to identify and select just a portion of the entire predetermined time-varying lighting pattern for playing-out;
determine, during playing out of the lighting pattern, a number of similarly configured lighting devices within a predetermined distance of the current location; and
adjust, based on the determined number of similarly configured lighting devices, a lighting parameter of the selected portion as it is played-out.

13. A centralized control unit as claimed in claim 12, wherein the controller is further configured to determine a location for each of the plurality of devices and to transmit to each device an indication of the respective location of that device for any device for use as the current location.

14. A centralized control unit as claimed in claim 12, wherein the timing indication is one of: a trigger signal; an absolute time; and a relative time.

15. A centralized control unit as claimed in claim 12, wherein the centralized control unit receives information from a camera having a field of view that encompasses said plurality of devices and wherein the centralized control unit comprises a processor for determining location information for each of the plurality of devices from this received information.

* * * * *